US007603698B2

(12) United States Patent
Konno

(10) Patent No.: US 7,603,698 B2
(45) Date of Patent: Oct. 13, 2009

(54) IMAGE FORMING APPARATUS AND IMAGE FORMING METHOD

(75) Inventor: Michiaki Konno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 665 days.

(21) Appl. No.: 11/009,919

(22) Filed: Dec. 10, 2004

(65) Prior Publication Data
US 2006/0130122 A1    Jun. 15, 2006

(51) Int. Cl.
*H04L 9/32* (2006.01)
(52) U.S. Cl. .......................................... 726/2
(58) Field of Classification Search ................ None
See application file for complete search history.

(56) References Cited

U.S. PATENT DOCUMENTS 7,181,762 B2 * 2/2007 Jerdonek ........................ 726/2

2003/0065805 A1 * 4/2003 Barnes, Jr. ................... 709/231
2005/0079857 A1 * 4/2005 Umezawa et al. ........... 455/406

FOREIGN PATENT DOCUMENTS

JP     2002-345027     11/2002

* cited by examiner

*Primary Examiner*—Brandon S Hoffman
(74) *Attorney, Agent, or Firm*—SoCal IP Law Group LLP; Steven C. Sereboff; John E. Gunther

(57) ABSTRACT

In a case where a client user is already registered in a database server, user authentication is executed. Specifically, login to a network with use of a username and a password is executed and an authentication server carries out an authentication process, or authentication with use of a user certificate is executed and the authentication server carries out the authentication process. If the authentication process by the authentication server is completed, image forming apparatus information including position information is displayed on the client user and the client user is permitted to execute network connection.

17 Claims, 12 Drawing Sheets

| Database AAA | | | |
|---|---|---|---|
| Domain server | Name | Kind | Explanation |
| −Access point | | | |
| AP-No.1 | MFP-No.1 | Image forming apparatus | 4F in office No.5 |
| AP-No.2 | MFP-No.2 | Image forming apparatus | Conference room in office No.3 |
| −Image forming apparatus | MFP-No.3 | Image forming apparatus | Reception room in office No.1 |
| +Builtin | | ............ | |
| +Computers | | | |
| +Domain COntrollers | | | |
| +Users | | | |

F I G. 4

| Ninsho_Server | | | |
|---|---|---|---|
| Authentication server | | | |
| -RADIUS client | | | |
| | Name | Address | Explanation |
| | nishima | 192.168.10.20 | 2B in office No.101 |
| | MFP-No.9 | 192.150.11 | 5F in office No.7 |
| | atami | 10.0.0.50 | Main reception room in office No.79 |
| | ............................. | | |
| +Connection request | | | |
| +Past connection request | | | |

FIG. 5

| Name | Address | Explanation | Authentication | Group | Position information |
|---|---|---|---|---|---|

Managed device
- Name: MFP-No.77
- IP address: 192.168.132.11
- Location: #7-56

Device information
- Device name: Image forming apparatus
- Administrator: m.komotu
- Contact number: 03-55-9812

F I G. 6

| Name | Kind | Explanation | Authentication | Group name | Position information |
|---|---|---|---|---|---|
| Position information | | #16-1F (design division 2) | | | |
| Position information image file | | ## _____ | | | |
| Management access point | | AP-No.2 | | | |

FIG. 7

IMAGE FORMING APPARATUS AND IMAGE FORMING METHOD

BACKGROUND OF THE INVENTION

1. Field of the Invention

The present invention relates to an image forming apparatus that is equipped with a wireless LAN device and forms an image, and to an image forming method.

2. Description of the Related Art

In recent years, an increasing number of notebook PCs (personal computers) have been equipped with wireless LAN devices, and many offices have adopted wireless LAN systems. In addition, in offices that are managed using networks, the wireless LAN security has been enhanced and the network environment using wireless LANs has been improved.

For example, even when a client user, which uses a wireless LAN in a head office is moved to a branch for a business trip, the client user is permitted to use mailing services, etc. in the wireless LAN environment in the branch by user authentication using a RADIUS server or the like as if the client user was in the head office.

However, when the client user executes a printing operation in the branch in the same manner as in the head office, there is such an inconvenience that it is necessary to confirm with office staff, who is nearby, about where the client user is currently positioned on the floor and where an image forming apparatus that is closest to the client user is located.

BRIEF SUMMARY OF THE INVENTION

The object of an aspect of the present invention is to provide an image forming apparatus and an image forming method, which can easily confirm position information of an image forming apparatus.

According to an aspect of the present invention, there is provided an image forming apparatus that is connected to an authentication server, the apparatus comprising: communication means for executing wireless communication with an external device; confirmation means for confirming, when the communication means receives a wireless communication start request from the external device, with the authentication server about whether the external device is a pre-registered external device; and control means for executing, when the confirming means confirms that the external device is the pre-registered external device, a control to transmit image forming apparatus information including position information of the image forming apparatus to the external device via the communication means.

According to another aspect of the present invention, there is provided an image forming method for an image forming apparatus that is connected to an authentication server, the method comprising: confirming, when wireless communication with an external device is executed and a wireless communication start request is received from the external device, with the authentication server about whether the external device is a pre-registered external device; and executing, when it is confirmed that that the external device is the pre-registered external device, a control to transmit image forming apparatus information including position information of the image forming apparatus to the external device by the wireless communication.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of an aspect of the invention.

FIG. 4 shows an example of registration in a database server;

FIG. 5 shows an example of registration in an authentication server;

FIG. 6 shows an example of registered content of RADIUS client information in the authentication server;

FIG. 7 shows an example of registration of image forming apparatus information in the database server;

DETAILED DESCRIPTION OF THE INVENTION

Embodiments of the present invention will now be described with reference to the accompanying drawings.

Figure 1:
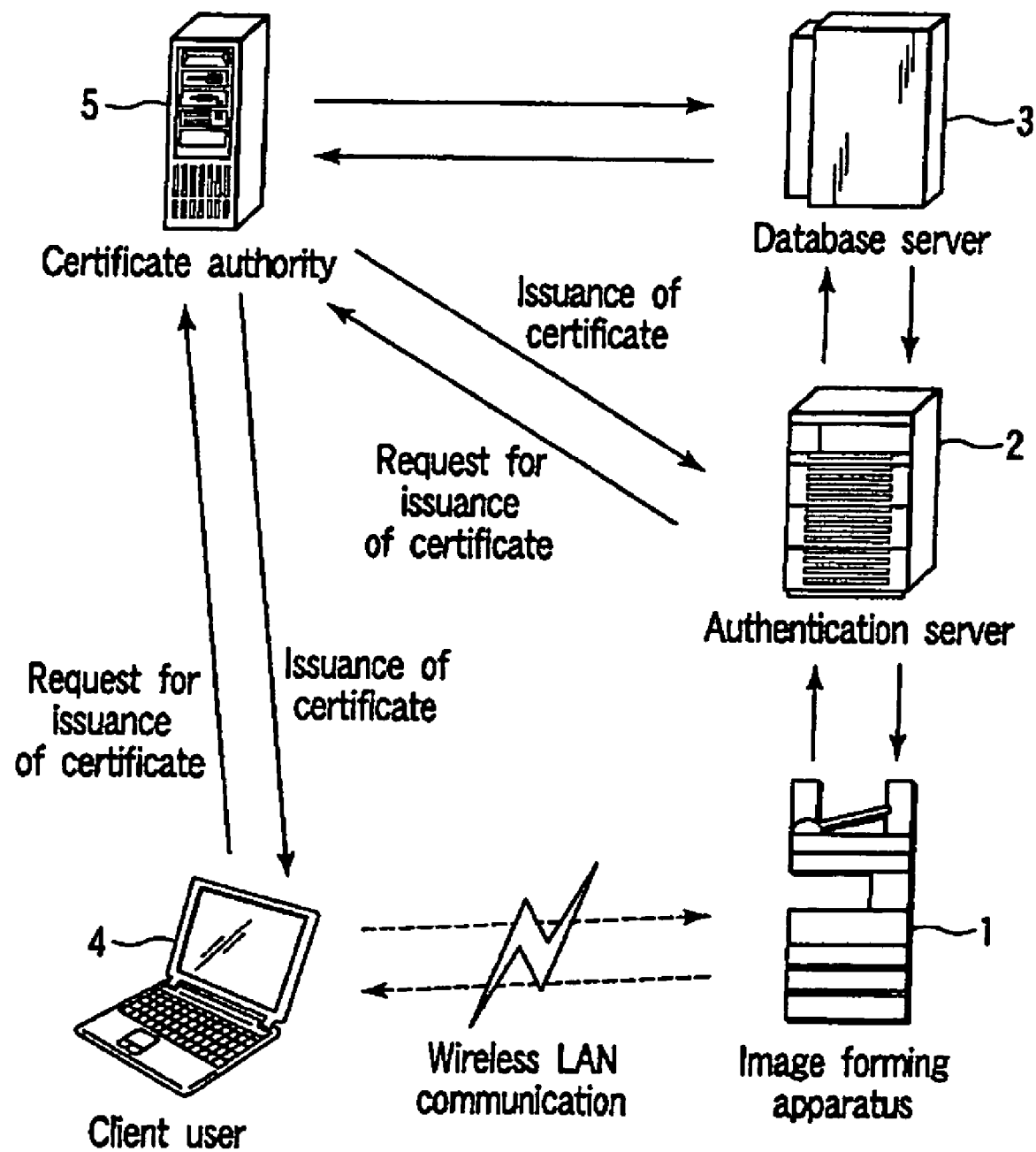
FIG. 1 shows a system configuration of a network environment to which an image forming apparatus according to a first embodiment of the invention is connected.

FIG. 1 shows a system configuration of a network environment to which an image forming apparatus according to a first embodiment of the invention is connected. In this system, an image forming apparatus 1 with a wireless LAN connection function, an authentication server 2 and a database server 3 are connected over cables. The image forming apparatus 1 and a notebook personal computer (client user) 4 with a wireless LAN connection function are configured to be able to execute wireless LAN communication.

Figure 2:
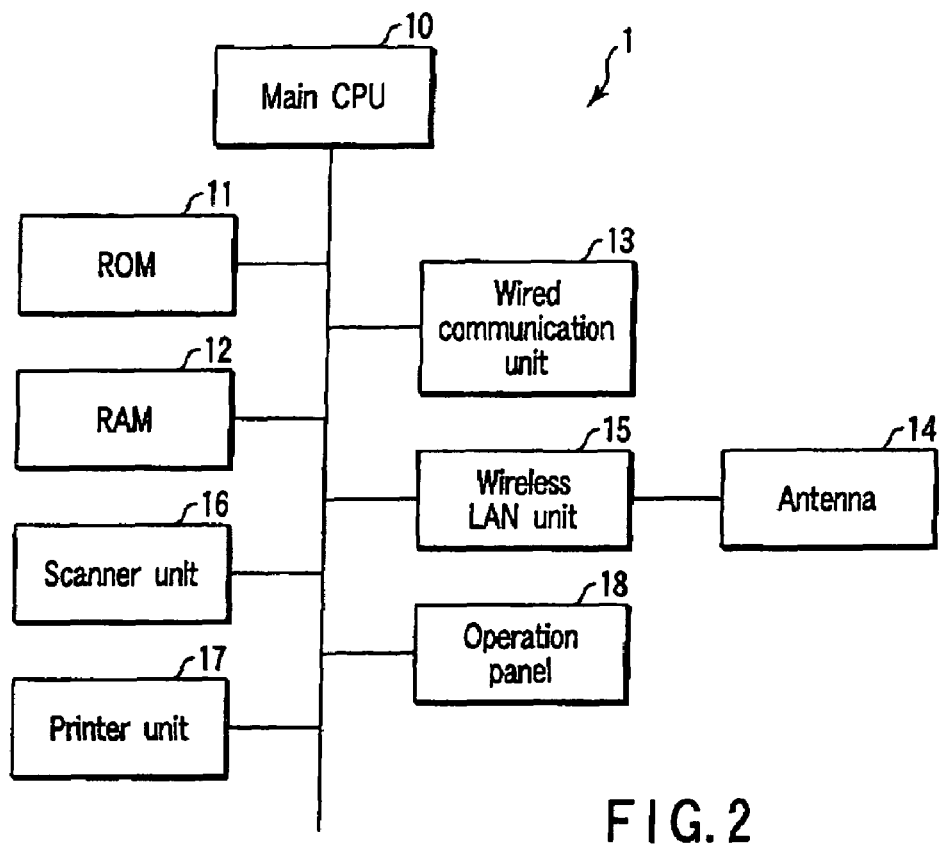
FIG. 2 is a block diagram that schematically shows the structure of the image forming apparatus.

FIG. 2 schematically shows the structure of the image forming apparatus 1. The image forming apparatus 1 comprises a main CPU 10 that executes an overall control, a ROM 11 that stores a control program, etc., a RAM 12 that temporarily stores data, a wired communication unit 13 that is connected to the authentication server 2, a wireless LAN unit 15 that is connected to an antenna 14 for executing wireless LAN communication, a scanner unit 16, a printer unit 17, and an operation panel 18.

Figure 3:
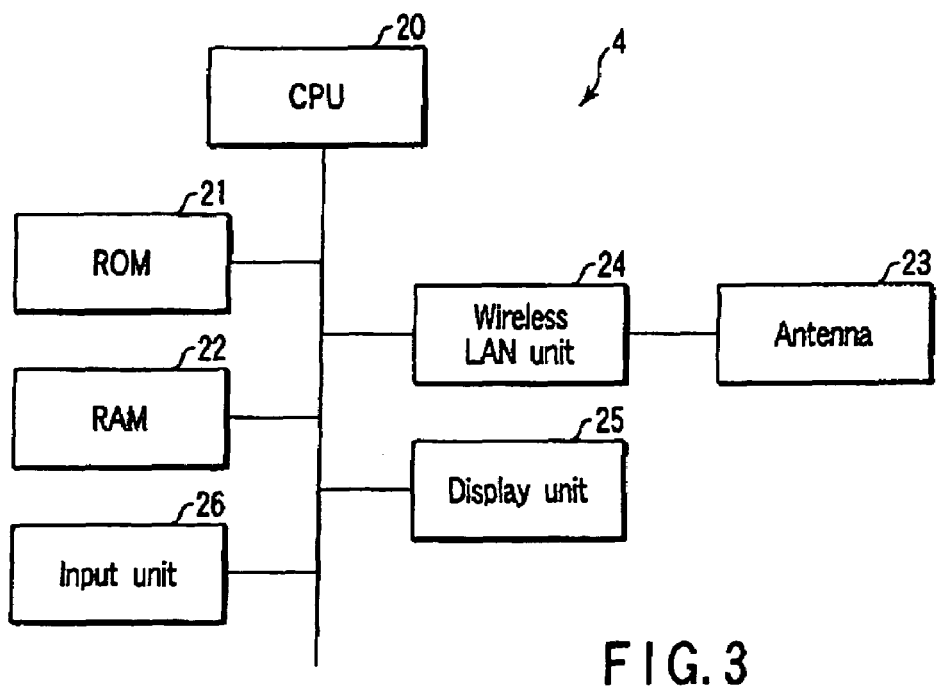
FIG. 3 is a block diagram that schematically shows the structure of a notebook personal computer.

FIG. 3 schematically shows the structure of the notebook personal computer 4 serving as a client user. The notebook personal computer 4 comprises a main CPU 20 that executes an overall control, a ROM 21 that stores a control program, etc., a RAM 22 that temporarily stores data, a wireless LAN unit 24 that has an antenna 23 for executing wireless LAN communication, a display unit 25, and an input unit 26.

In the description below, the notebook personal computer 4 is referred to as the client user 4. The client user 4 is not limited to the notebook personal computer, and may be a mobile personal computer.

In the wireless LAN security environment that has been described above, a network administrator executes user registration of the client user 4 in the database server 3 in order to permit connection to the wireless LAN network.

FIG. 4 shows an example of registration in the database server 3.

The image forming apparatus 1 serves as a wireless LAN access point for the client user 4 and executes connection relay (access point mode) with the wired LAN. In addition, the image forming apparatus 1 serves as RADIUS client, and the network administrator registers an IP address, a network password and image forming apparatus information (position information) of the RADIUS client in the authentication server 2.

FIG. 5 shows an example of registration in the authentication server 2.

FIG. 6 shows an example of registered content of RADIUS client information in the authentication server 2.

The image forming apparatus information (IP address, network password, position information) is also registered in the database server 3, thereby to enable another authentication server (not shown) to refer to the information relating to the image forming apparatus.

FIG. 7 shows an example of registration of image forming apparatus information in the database server 3.

Figure 8:
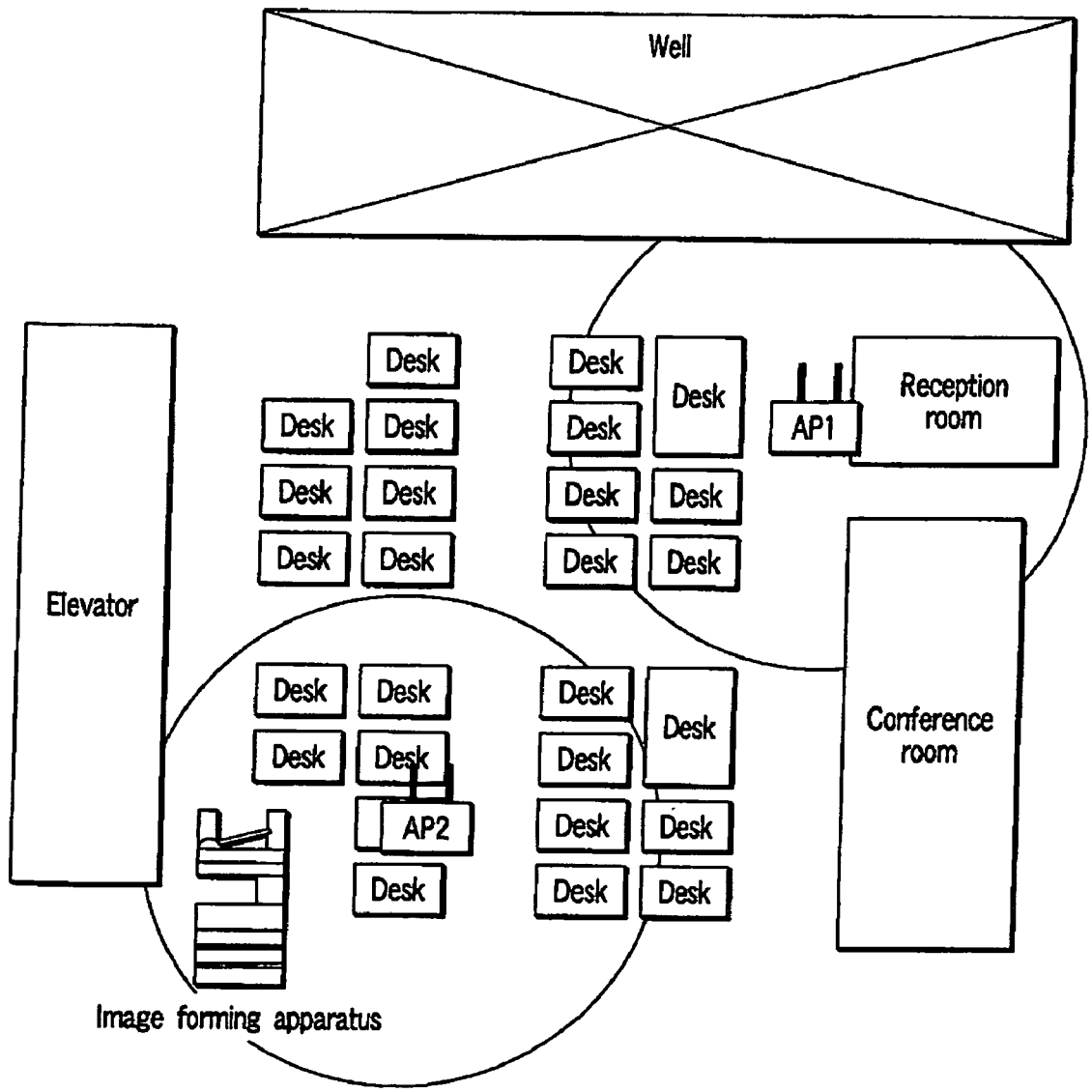
FIG. 8 shows an example of registration of position information according to the present invention.

FIG. 8 shows an example of registration of position information according to the present invention. The position information is representative of a position where the image forming apparatus is located within a room.

The authentication server 2 is an authentication server that is relied upon on the network. The authentication server 2 requests issuance of a server certificate from a certificate authority 5, and an issued certificate is installed in the authentication server 2.

When the client user 4 is to connect to the network and to send a print request to the image forming apparatus 1, the client user 4 is required to receive authentication from the authentication server 2 by one of the following two methods, in order to certify that the client user 1 is a user that is registered in the database server 3.

(1) Using a username and a user password, the client user 4 receives authentication from the authentication server 2 via the image forming apparatus 1 that functions as the wireless LAN access point.

(2) The client user 4 sends a request for issuance of a user certificate to the certificate authority 5. The certificate authority 5 confirms whether the client user 4 is registered in the database server 3. If the certificate authority 5 confirms that the client user 4 is registered in the database server 3, the certificate authority 5 issues a user certificate to the client user 4. At this time, the certificate authority 5 requests the user password from the client user 4 in order to confirm that the client user 4 is not a false one. When the client user 4 accesses the image forming apparatus 1, the client user 4 uses the user certificate and receives authentication by the authentication server 2.

Figure 9:
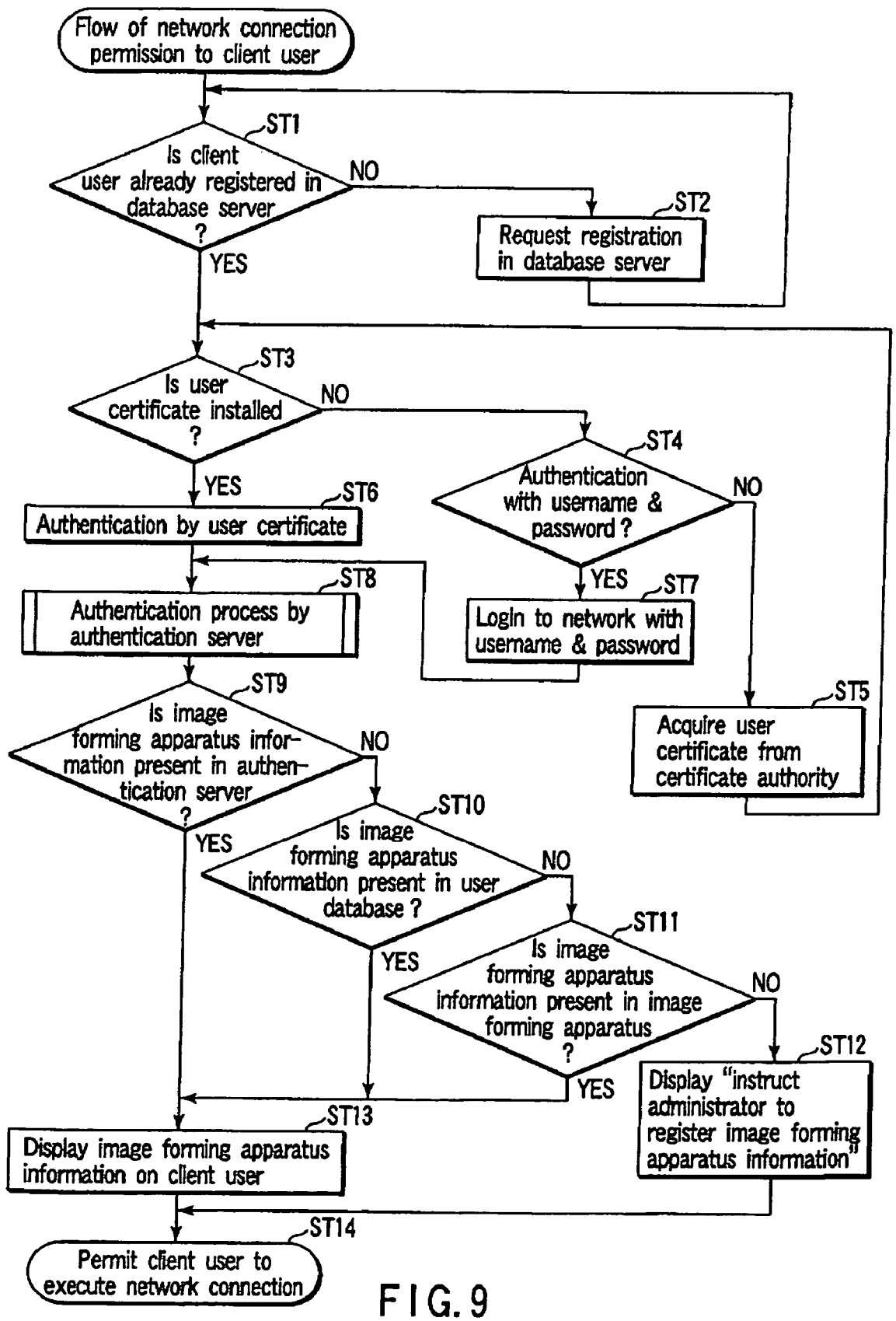
FIG. 9 is a flow chart that illustrates a process flow of network connection permission to a client user.

Next, referring to a flow chart of FIG. 9, a description is given of the process flow of network access permission to the client user 4.

To start with, it is checked whether the client user 4 is already registered in the database server 3 (ST1).

If the client user 4 is not registered in step ST1, the client user 4 requests registration in the database server 3 (ST2).

If the client user 4 is already registered in step ST1, it is checked whether a user certificate is installed (ST3).

If the user certificate is not installed in step ST3, it is determined whether username & password authentication is to be executed (ST4).

If the authentication is not to be executed in step ST4, an operation for acquiring a user certificate from the certificate authority 5 is executed (ST5), and the control returns to step ST3.

If the authentication is to be executed in step ST4, login to the network with a username and a password is executed (ST7) and the authentication server 2 executes an authentication process (ST8).

If the user certificate is installed in step ST3, authentication using the user certificate is executed (ST6), and the authentication server 2 executes the authentication process (ST8).

If the authentication process by the authentication server 2 in step ST8 is completed, it is checked whether there is image forming apparatus information in the authentication server 2 (ST9).

If the image forming apparatus information is not present in the authentication server 2 in step ST9, it is checked whether the image forming apparatus information is present in the database server 3 (ST10).

If the image forming apparatus information is not present in the database server 3 in step ST10, it is checked whether the image forming apparatus information is present in the image forming apparatus 1 (ST11).

If the image forming apparatus information is not present in the image forming apparatus 1 in step ST11, an instruction for registration of image forming apparatus information by the administrator is issued (ST12), and the client user 4 is permitted to execute network connection (ST14).

If the image forming apparatus information is present in step ST9, step ST10 or step ST11, the image forming apparatus information is displayed on the client user 4 (ST13) and the client user 4 is permitted to execute network connection (ST14).

Figure 10:
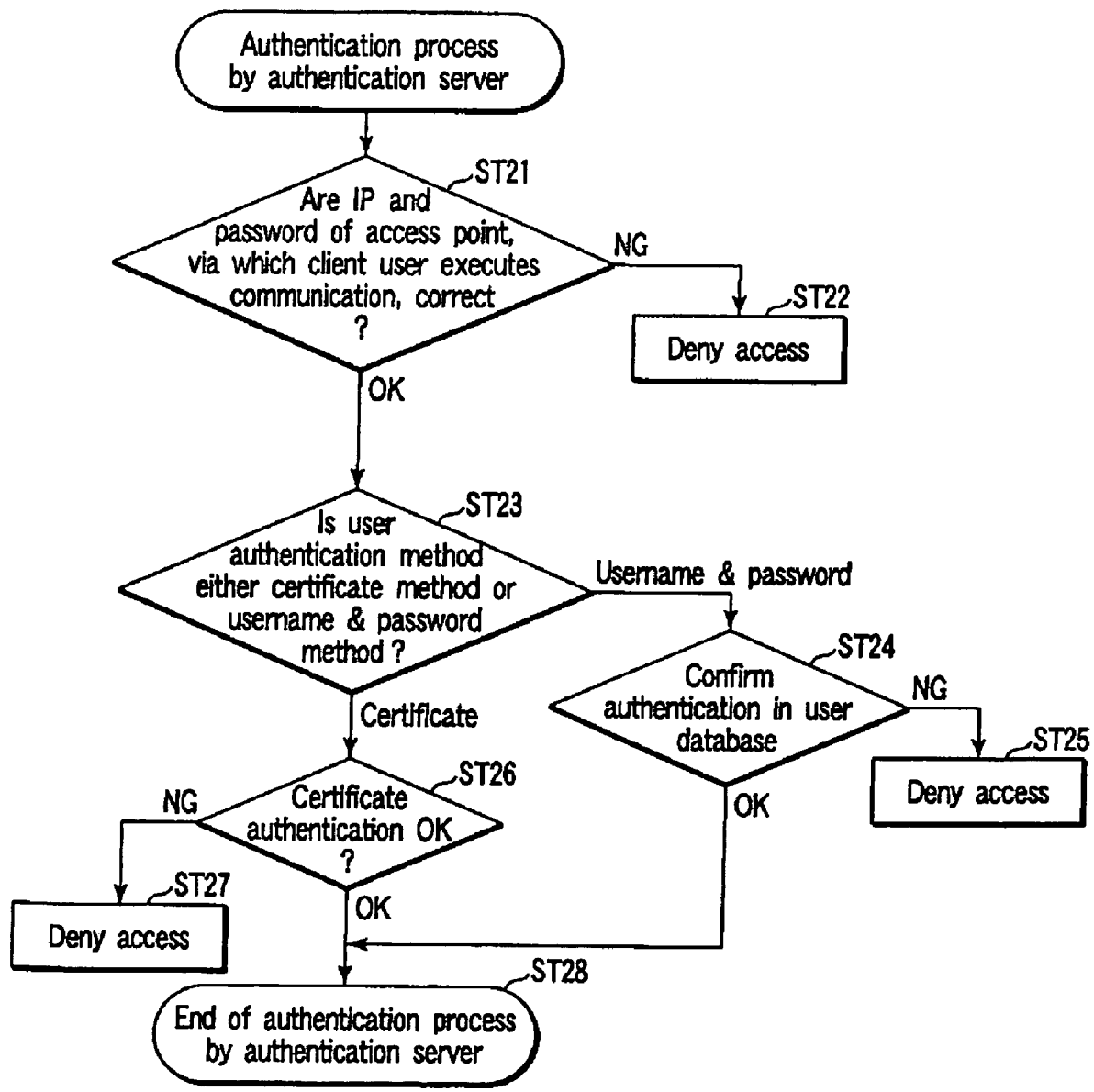
FIG. 10 is a flow chart that illustrates the operation of an authentication process by the authentication server.

Next, the operation of the authentication process by the authentication server 2 in step ST8 is described referring to a flow chart of FIG. 10.

To start with, it is checked whether the IP and password of the access point, via which the client user executes communication, are correct (ST21).

If the IP and password are incorrect in step ST21, the authentication server 2 denies access (ST22).

If the IP and password are correct, the authentication server 2 checks the user authentication method (ST23). That is, the authentication server 2 checks whether the user authentication method is a user certificate method or a username & password method.

If the user authentication method is the username & password method in step ST23, the authentication server 2 confirms authentication of user registration in the database server 3 (ST24).

If the authentication is not confirmed in step ST24, the authentication server 2 denies access (ST25).

If the authentication is confirmed in step ST24, the authentication process is completed (ST28).

In the case where the user authentication method is the user certificate method in step ST23, the authentication server 2 confirms whether the user certificate is correct (ST26).

If the user certificate is not correct in step ST26, the authentication server 2 denies access (ST27).

If the user certificate is correct in step ST26, the authentication server 2 completes the authentication process (ST28).

With the above-described structure, when the client user 4 is authenticated by the authentication server 2, the client user 4 can acquire the image forming apparatus information including position information.

The client user 4 is enabled to access the image forming apparatus 1 and to acquire the image forming apparatus information including position information, which is stored in the authentication server 2. If the image forming apparatus information is not present in the authentication server 2, the client user 4 acquires the image forming apparatus information including position information from the database server 3.

Figure 11:
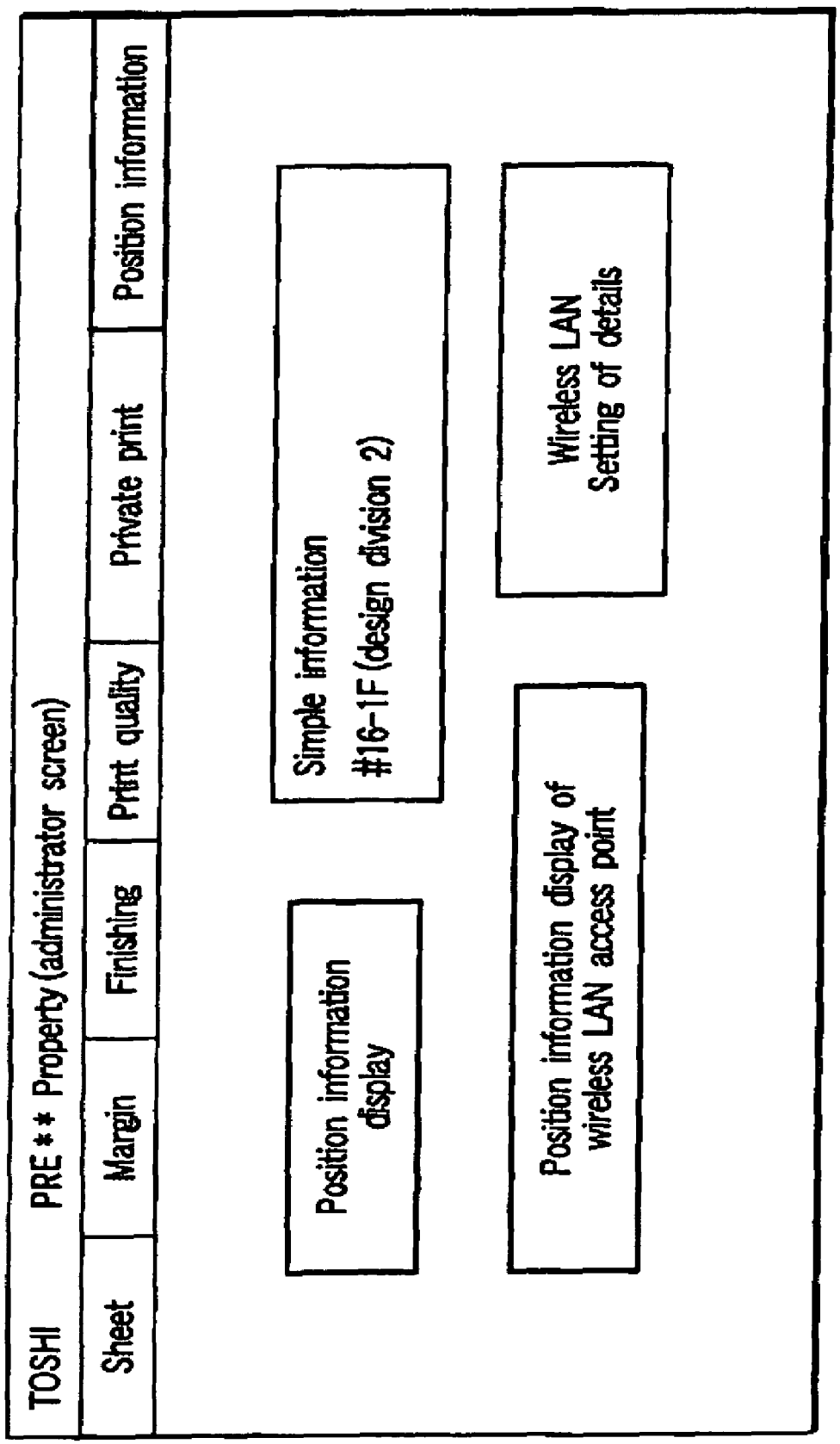
FIG. 11 shows an example of display of image forming apparatus information including position information that is acquired by the client user.

FIG. 11 shows an example of display of image forming apparatus information including position information that is acquired by the client user 4.

The client user 4 is thus enabled to use the image forming apparatus information including position information.

Next, a second embodiment is described.

Figure 12:
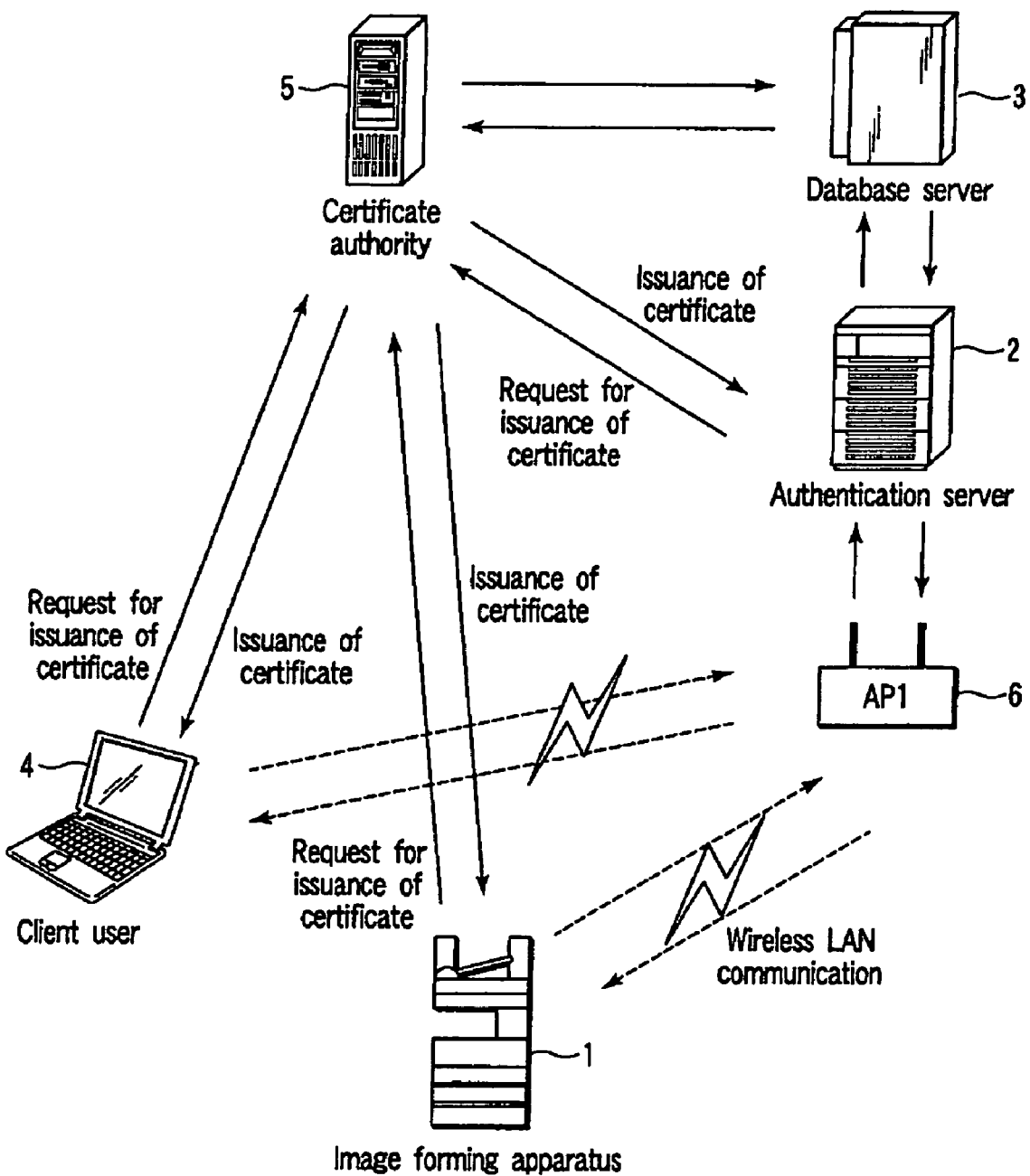
FIG. 12 shows a system configuration of a network environment to which an image forming apparatus according to a second embodiment of the invention is connected.

FIG. 12 shows a system configuration of a network environment to which an image forming apparatus according to the second embodiment of the invention is connected.

In this system configuration, a dedicated access point (AP) 6 is added to the system configuration of FIG. 1. The parts common to those in the system configuration of FIG. 1 are denoted by like reference numerals, and a description thereof is omitted.

Figure 13:
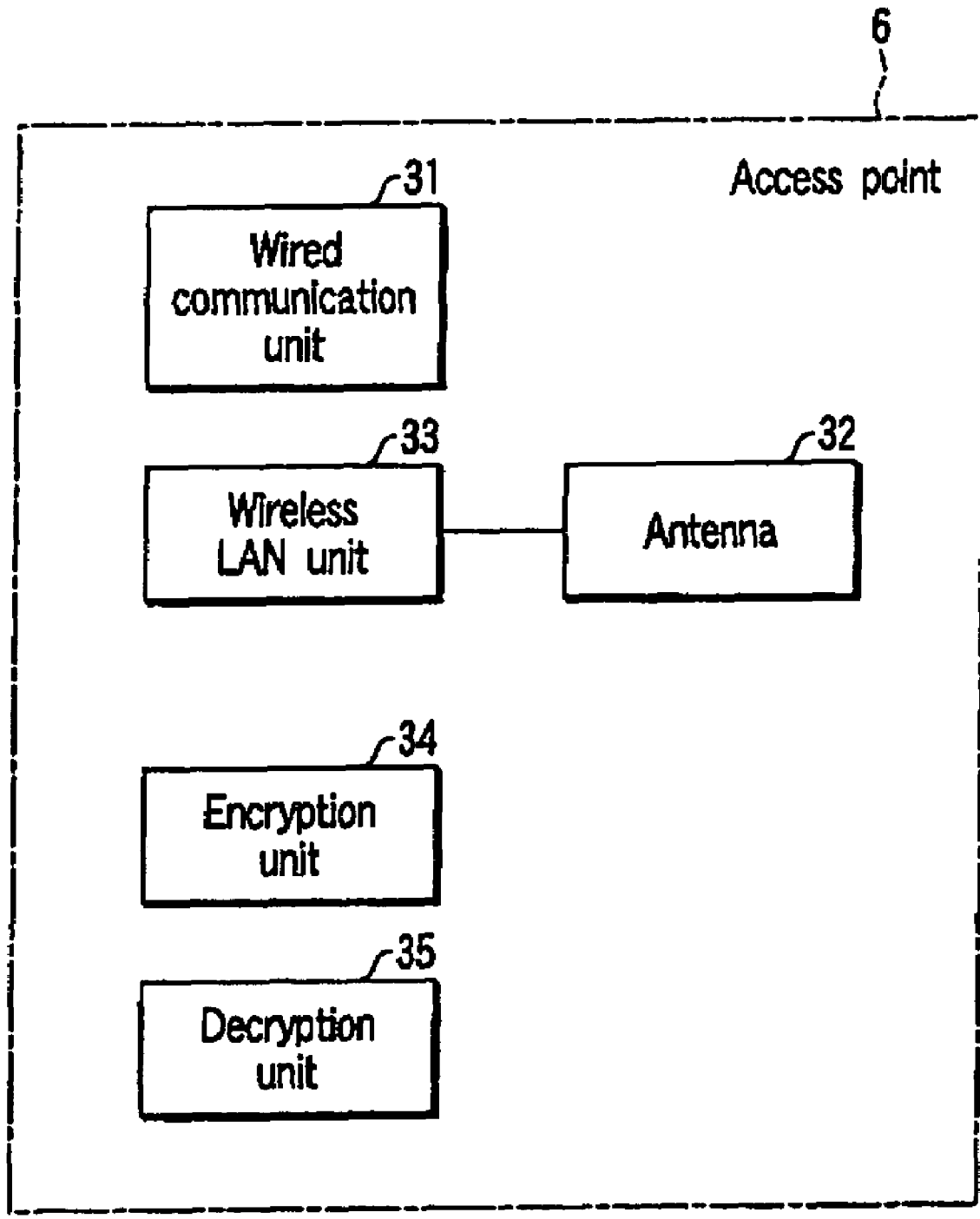
FIG. 13 is a block diagram that schematically shows the structure of an access point.

FIG. 13 schematically shows the structure of the AP 6. The AP 6 comprises a wired communication unit 31 that is connected to the authentication server 2, a wireless LAN unit 33 that is connected to an antenna 32 for executing wireless LAN communication, an encryption unit 34, and a decryption unit 35.

Wireless LAN communication is executed between the AP 6 and client user 4, and between the AP 6 and the image forming apparatus 1. In this case, data that is transmitted is encrypted for security.

In the present embodiment, the image forming apparatus 1 also requests issuance of a certificate from the certificate authority 5, and a certificate is installed in the image forming apparatus 1.

With the above-described structure, when the client user 4 is authenticated by the authentication server 2 via the AP 6, the client user 4 can acquire the image forming apparatus information including position information.

The client user 4 is thus enabled to use the image forming apparatus information including position information.

As has been described above, according to the above-described embodiments, the following operation is enabled. That is, there is a case where a user (PC), the user information of which is registered in a user database (e.g. Active Directory) of a head office, is moved to a branch for a business trip or the like. In this case, if there is such an environment that a user database in the branch is linked to the user database information in the head office or that a network administrator in the branch, to which the user is moved for the business trip, permits connection to the network in the branch (i.e. when registration as a user in the domain is permitted or when a user certificate is issued), the user (PC) is permitted to execute network connection by the authentication server via the connection relay device (i.e. the access point or the image forming apparatus having the same function as the access point). Thereby, the user (PC) is enabled to acquire the image forming apparatus information (including position information) and to smoothly execute operations such as printing and scanning.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus that is connected to an authentication server and a database server, the apparatus comprising:

communication means for executing wireless communication with an external device;

confirmation means for confirming, when the communication means receives a wireless communication start request from the external device, with the authentication server about whether the external device is a pre-registered external device; and control means for executing, when the confirming means confirms that the external device is the pre-registered external device, a control to transmit image forming apparatus information including position information of the image forming apparatus to the external device via the communication means, when the image forming apparatus information is not present in the authentication server nor in the database server and when the image forming apparatus information is present in the image forming apparatus.

2. The image forming apparatus according to claim 1, wherein the external device is a notebook personal computer or a mobile personal computer.

3. The image forming apparatus according to claim 1, wherein the communication means executes wireless LAN communication.

4. The image forming apparatus according to claim 1, wherein the confirmation means transmits a user certificate, which is preinstalled in the external device, to the authentication server and obtains an authentication result about whether the external device is the pre-registered external device.

5. The image forming apparatus according to claim 1, wherein the confirmation means transmits a username and a password, which are input from the external device, to the authentication server and obtains an authentication result about whether the external device is the pre-registered external device.

6. The image forming apparatus according to claim 1, wherein the position information that is included in the image forming apparatus information is information that identifies a location where the image forming apparatus is placed.

7. The image forming apparatus according to claim 1, wherein the image forming apparatus information including the position information of the image forming apparatus is read out of one of the authentication server and a database server that is connected to the authentication server.

8. An image forming apparatus comprising:

communication means for executing wireless communication with an access point that is connected to an authentication server and a database server;

first control means for executing, when a wireless communication start request is sent with use of the communication means to the authentication server that is connected to the access point, a control to transmit preacquired certificate information, which certifies that the image forming apparatus is a pre-registered apparatus, to the authentication server via the communication means; and second control means for executing, when the authentication by the authentication server is acquired by the first control means, a control to transmit image forming apparatus information including position information of the image forming apparatus via the access point in accordance with a request from an external device that is authenticated by the authentication server, when the image forming apparatus information is not present in the authentication server nor in the database server and when the image forming apparatus information is present in the image forming apparatus.

9. An image forming method for an image forming apparatus that is connected to an authentication server and a database server, the method comprising:

confirming, when wireless communication with an external device is executed and a wireless communication start request is received from the external device, with the authentication server about whether the external device is a pre-registered external device; and executing, when it is confirmed that the external device is the pre-registered external device, a control to transmit image forming apparatus information including position information of the image forming apparatus to the external device by the wireless communication, when the image forming apparatus information is not present in the authentication server nor in the database server and when the image forming apparatus information is present in the image forming apparatus.

10. An image forming apparatus that is connected to an authentication server and a database server, the apparatus comprising:

a wireless communication unit that executes wireless communication with an external device; and a CPU that executes, when the wireless communication unit receives a wireless communication start request from the external device, a control to confirm with the authentication server about whether the external device is a pre-registered external device, and executes, when it is confirmed that the external device is the pre-registered external device, a control to transmit image forming apparatus information including position information of the image forming apparatus to the external device via the wireless communication unit, when the image forming apparatus information is not present in the authentication server nor in the database server and when the image forming apparatus information is present in the image forming apparatus.

11. The image forming apparatus according to claim 10, wherein the wireless communication unit executes wireless LAN communication.

12. The image forming apparatus according to claim 10, wherein the CPU transmits a user certificate, which is preinstalled in the external device, to the authentication server and obtains an authentication result about whether the external device is the pre-registered external device.

13. The image forming apparatus according to claim 10, wherein the CPU transmits a username and a password, which are input from the external device, to the authentication server and obtains an authentication result about whether the external device is the pre-registered external device.

14. An image forming system, comprising:
an access port for wireless LAN communication;
an authentication server, which is connected to the access port and performs authentication processing;
a database server connected to the authentication server;
a personal computer having a communication section to execute wireless LAN communication with the access port; and
an image forming apparatus having:
a communication section which executes wireless LAN communication the authentication server, the database server, and the personal computer via the access port;
a control unit which
performs authentication processing via the communication unit in association with the authentication server upon receiving a print request from the personal computer via the communication unit,
when the authentication server determines that the personal computer is authorized, detects position information of the image processing apparatus from one of the authentication server and the database server, or, when position information of the imager processing apparatus is not contained in either of the authentication server and the database server, from the image processing apparatus, and
transmits the detected position information of the image forming apparatus to the personal computer via the communication unit.

15. The image forming system according to claim 14, further comprising means for notifying a manager by a display that the position information of the image forming apparatus should be registered when the position information of the image forming apparatus is not present in any of the authentication server, the database server, and the image forming apparatus.

16. An imaging forming method for an image forming system including an access point for wireless LAN communication, an authentication server connected to the access point for performing authentication processing, a database server connected to the authentication server, a personal computer having a communication section to execute wireless LAN communication with the access point, and an image forming apparatus having a communication unit which executes wireless LAN communication with the authentication server and the personal computer via the access point, the method comprising:

performing authentication processing via the communication unit in association with the authentication server upon receiving a print request from the personal computer via the communication unit,
when the authentication server determines that the personal computer is authorized, detecting position information of the image processing apparatus from one of the authentication server and the database server, or, when position information of the imager processing apparatus is not contained in either of the authentication server and the database server, from the image processing apparatus, and
transmitting the detected position information of the image forming apparatus to the personal computer via the communication unit.

17. The image forming method according to claim 16, further comprising notifying a manager by a display that the position information of the image forming apparatus should be registered when the position information of the image forming apparatus is not present in any of the authentication server, the database server, and the image forming apparatus.

* * * * *